United States Patent
Wood et al.

[11] 3,812,618
[45] May 28, 1974

[54] SEED-FOAM-FABRIC COMPOSITE

[75] Inventors: Louis L. Wood, Rockville; Clifton L. Kehr, Silver Spring, both of Md.; Kurt C. Frisch, Grosse Ile, Mich.

[73] Assignee: W. R. Grace & Co., New York, N.Y.

[22] Filed: Mar. 8, 1973

[21] Appl. No.: 339,489

Related U.S. Application Data
[63] Continuation-in-part of Ser. No. 250,012, May 3, 1972, abandoned.

[52] U.S. Cl.............. 47/56, 260/2.5, 47/34.13, 47/57.6
[51] Int. Cl.............................................. A01g 9/10
[58] Field of Search.......... 71/1; 260/2.5; 47/37, 56, 47/57.6, 34.13, DIG. 7

[56] References Cited
UNITED STATES PATENTS

| | | | |
|---|---|---|---|
| 2,726,219 | 12/1955 | Hill | 260/2.5 |
| 2,901,445 | 8/1959 | Harris | 260/2.5 |
| 2,965,584 | 12/1960 | Elkin | 260/2.5 |
| 2,988,441 | 6/1961 | Pruitt | 47/37 X |
| 3,245,776 | 4/1966 | Rubin | 71/1 |
| 3,375,607 | 4/1968 | Melvold | 47/37 |
| 3,543,438 | 12/1970 | Edwards | 47/34.13 |
| 3,546,055 | 12/1970 | Spertus | 47/34.13 UX |
| 3,703,786 | 11/1972 | Swan | 47/56 |
| 3,706,678 | 12/1972 | Dietrich et al. | 260/2.5 AD |

*Primary Examiner*—Robert E. Bagwill
*Attorney, Agent, or Firm*—Eugene M. Bond

[57] ABSTRACT

The invention disclosed provides a seed-foam-fabric composite which may be readily applied over a ground area for supporting and protecting seeds during germination.

19 Claims, 8 Drawing Figures

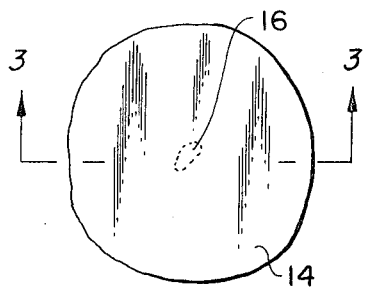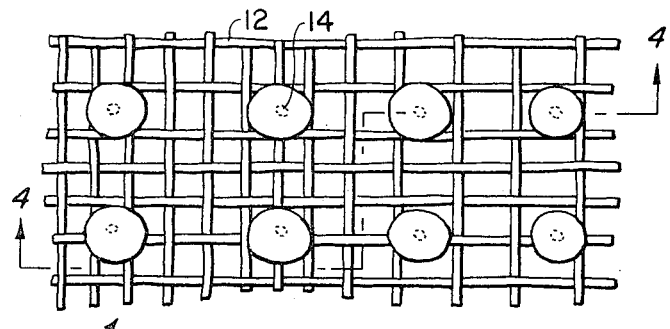
FIG. 1  FIG. 2
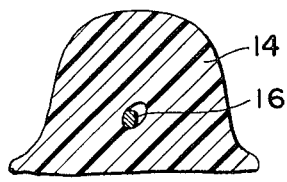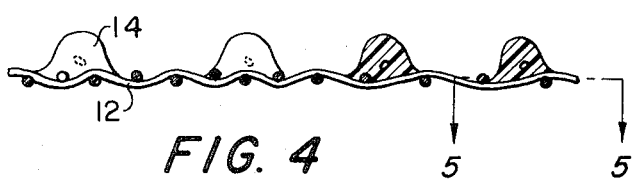
FIG. 3  FIG. 4
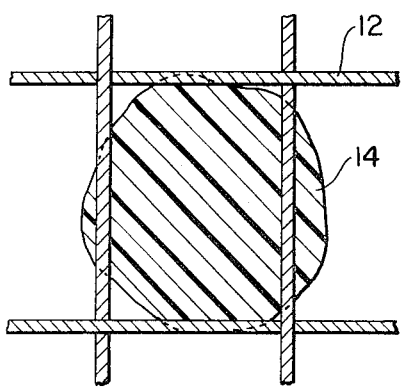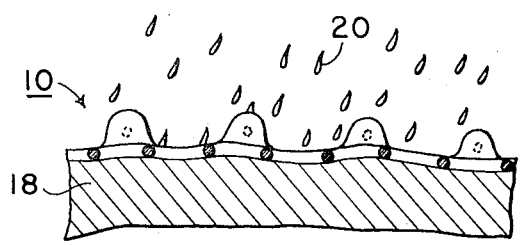
FIG. 5  FIG. 6
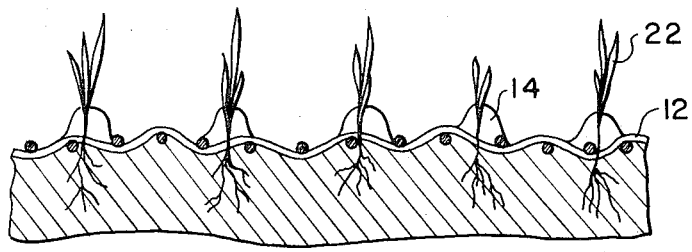
FIG. 7

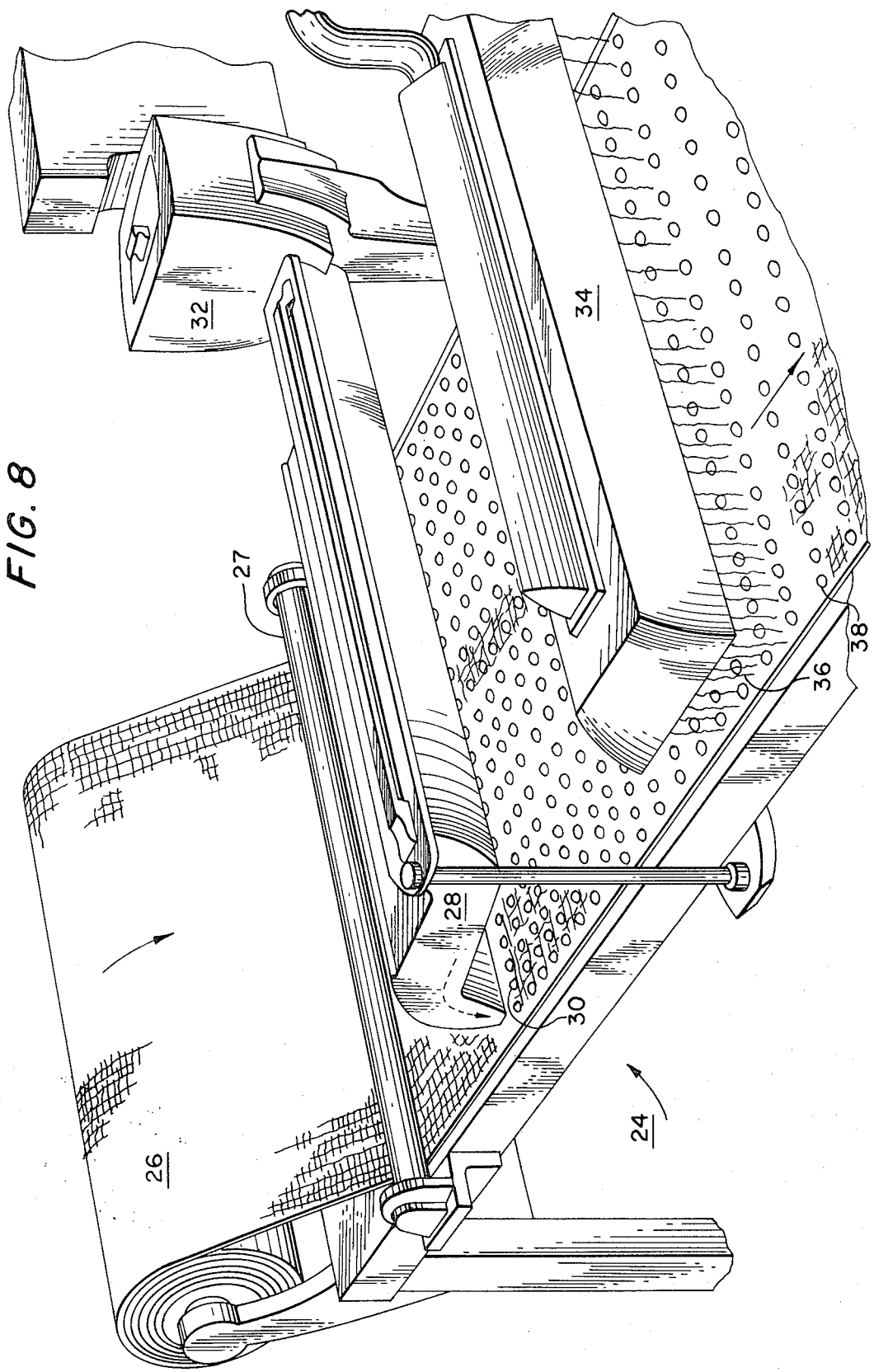

SEED-FOAM-FABRIC COMPOSITE

This application for U.S. letters Pat. is a continuation-in-part of U.S. application Ser. No. 250,012, filed May 3, 1972, now abandoned.

This invention relates to a method for preparing a new improved seed-foam-fabric composite and more particularly, to preparation of such a product by incorporation of seeds into droppings of resin at the time of foaming. The seed pattern in the resultant product may be configurated as desired for subsequent usage in supporting and protecting seeds during germination.

Numerous attempts have been made in the prior art in preparing a foam-seed product. In some cases, seeds are merely dispersed in a foam blanket structure. Because of the weight and volume of foam required, such prior art products have realized only limited acceptance or use in specialized areas and greatly restricted amounts.

It has now been found that by practice of the present invention, there is provided a new improved seed-foam-fabric composite product which is commercially practical and which overcomes numerous inherent disadvantages of prior art methods and products. The present composite is simple, highly efficient wherein seeds are disposed in particle portions of foam included in the reactant prior to foaming while the foam is disposed on a fabric backing, preferably biodegradable. The generated foams are typically characterized by having a crosslinked, i.e., non-linear, molecular network with seeds disposed in particle portions thereof.

Generally stated, the present seed-foam-composite includes a crosslinked hydrophilic foam which may be prepared by capping polyoxyethylene polyol with a polyisocyanate such that the capped product has a reaction functionality greater than two. The capped product is foamed simply by combining with an aqueous reactant in the presence of seeds. Optionally, the capped product and/or aqueous reactant may contain a suitable crosslinking agent, if desired, in which case the capped polyoxyethylene polyol product may have a functionality approximating 2, provided however that the foaming reaction is initiated in the presence of seeds while disposed on a fabric backing in particle portions.

Practice of the present invention will become more apparent from the following detailed description taken in conjunction with the drawings wherein:

FIG. 1 illustrates a top view of a seed containing foam portion;

FIG. 2 is a portion of the present seed-foam-fabric composite taken as a top elevational view;

FIG. 3 is a partial side sectional view taken along section lines 3—3 of FIG. 1;

FIG. 4 illustrates a partial side sectional view taken along section lines 4—4 of FIG. 2;

FIG. 5 is a sectional view taken along section lines 5—5 of FIG. 4;

FIG. 6 is a partial view illustrating the seed-foam-fabric composite disposed on a surface area during seed germination;

FIG. 7 illustrates plant formation by means of the present composite; and

FIG. 8 is a perspective view illustrating means employed in preparing the present seed-foam-fabric composite.

In the drawings wherein similar elements are identified using similar numerals throughout the several views, FIGS. 1–5 illustrate seed-foam-fabric composite 10 having fabric layer 12 disposed as a support surface for foam portions 14 containing seed 16.

When used, seed-foam-fabric composite 10 is layered onto a ground surface 18 such as illustrated in FIGS. 6–7. When water 20 is applied, the seeds germinate for development into plants 22.

Because the fabric layer is desirably biodegradable composition, and because it forms the significant area portion of the present composite, little remains after plant formation has taken place. The minor foam particles which remain usefully serve to prevent solid ground packing and provide aeration means for the soil.

FIG. 8 illustrates apparatus 24 usefully employed in preparing the present seed-foam-fabric composite. A roll 26 of fabric is taken past guide 27 under extrusion trough 28 wherefrom drops of resin 30 are received and disposed in any pattern desired. Resin 30 may be channeled by screw conveyor or the like, not shown, from storage container 32. Thereafter, the resin-fabric is passed under an aqueous reactant containing trough 34 from which aqueous reactant 36 passes onto the resin. Excess reactant passing through the fabric may be recycled to trough 34 by conventional means.

After the resin receives the aqueous reactant from trough 34, the resin begins to foam. Although not illustrated, after the resin begins to foam, seeds may be cast or salted onto the foaming resin by any suitable means. It will be apparent that seeds which do not contact the foam will pass through the fabric and may be recovered. Alternatively, the seeds may be introduced by admixture with the resin, i.e., via trough 28, or by admixture with the aqueous reactant, i.e., via trough 34.

After the foaming reaction has concluded, the seed-foam-fabric composite may be rolled for shipment and use. Sections of the composite may be cut as desired from the roll at the use location and upon placement and watering, seed germination is effected.

Crosslinked hydrophilic foam useful herein may be prepared by capping polyoxyethylene polyol with a polyisocyanate such that the capped product has a reaction functionality greater than two.

During capping, it is desirable that polyisocyanate be reacted with the polyol such that the reaction product, i.e., the capped product, is substantially void of reactive hydroxy groups while containing more than two reactive isocyanate sites per average molecule. Another route for achieving this desired result is to react a polyisocyanate having two reactive active isocyanate sites per average molecule, in a reaction system during foaming having a polyfunctional reactive component such as one having from three up to about six or more reactive amine, hydroxy, thiol, or carboxylate sites per average molecule. These latter sites are highly reactive with the two reactive isocyanate sites and thereby form a dimensional product.

Polyoxyethylene polyol used as a reactant in preparing the capped product to be foamed may have a weight average molecular weight of about 200 to about 20,000, and preferably between about 600 to about 6,000, with a hydroxyl functionality of about 2 or greater, preferably from about 2 to about 6.

Polyoxyethylene polyol is terminated or capped by reaction with a polyisocyanate. The reaction may be carried out in an inert moisture-free atmosphere such as under a nitrogen blanket, at atmospheric pressure at a temperature in the range of from about 0° C. to about 120° C. for a period of time of about 20 hours depending upon the temperature and degree of agitation. This reaction may be effected also under atmospheric conditions provided the product is not exposed to excess moisture. The polyisocyanates used for capping the polyoxyethylene polyol include polyisocyanates and polyisothiocyanates which are PAPPI-1 (a polyaryl polyisocyanate as defined in U.S. Pat. No. 2,683,730), tolylene diisocyanate, triphenylmethane-4,4', 4'''-triisocyanate, benzene-1,3,5-triisocyanate, toluene-2,4,6-triisocyanate, diphenyl-2,4,4'-triisocyanate, hexamethylene diisocyanate, xylene diisocyanate, chlorophenylene diisocyanate, diphenylmethane-4,4'-diisocyanate, naphthalene-1, 5-diisocyanate, xylene-alpha,alpha'-diisothiocyanate, 3,3'-dimethyl-4, 4'-biphenylene diisocyanate, 3,3'-dimethoxy-4, 4'-biphenylene diisocyanate, 2,2',5,5'-tetramethyl-4, 4'-biphenylene diisocyanate, 4,4'-methylenebis (phenylisocyanate), 4,4'-sulfonylbis (phenylisocyanate), 4,4'-methylene di-ortho-tolylisocyanate, ethylene diisocyanate, ethylene diisothiocyanate, trimethylenediisocyanate and the like. Mixtures of any one or more of the above mentioned organic isothiocyanates or isocyanates may be used as desired. The aromatic diisocyanates and polyisocyanates or mixtures thereof which are especially suitable are those which are readily commercially available, have a high degree of reactivity and a relatively low cost.

Capping of the polyol may be effected using stoichiometric amounts of reactants. Desirably, however, an excess of isocyanate is used to insure complete capping of the polyol. Thus, the ratio of isocyanate groups to the hydroxyl groups used for capping is between about 1 to about 4 isocyanate to hydroxyl, and preferably about 2 to about 3 isocyanate to hydroxyl molar ratio. The isocyanate capped polyoxyethylene polyol reaction products are formulated in such a manner as to give crosslinked, three dimensional network polymers on foaming. In order to achieve such infinite network formation on foaming, the reactive components may be formulated in one of the following by way of example. First, when water is the sole reactant with the isocyanate groups leading to chain growth during the foaming process, the isocyanate capped polyoxyethylene polyol reaction product must have an average isocyanate functionality greater than 2 and up to about 6 or more depending upon the composition of the polyol and capping agent components. Secondly, when the isocyanate capped polyoxyethylene polyol has an isocyanate functionality of only about two, then the water or aqueous reactant used may contain a dissolved or dispersed isocyanate-reactive crosslinking agent having an effective functionality greater than two. In this case, the reactive crosslinking agent is reacted with the capped polyoxyethylene polyol when admixed during and after the foaming process has been initiated. Thirdly, when the isocyanate capped polyoxyethylene polyol has an isocyanate functionality of only about two, then a polyisocyanate crosslinking agent having an isocyanate functionality greater than two may be incorporated therein, either preformed or formed in situ, and the resultant mixture may then be reacted with water or aqueous reactant, optionally containing a dissolved or dispersed reactive isocyanate-reactive crosslinking agent, leading to a crosslinked, infinite network hydrophilic polyurethane foam.

Several different modes may be used to prepare the hydrophilic capped polyoxyethylene polyol reaction product having an average isocyanate functionality greater than two. One useful mode is to polymerize ethylene oxide in the presence of a polyfunctional hydroxyl containing starter component such as glycerol, trimethylolpropane, or trimethylolethane and the like which leads to polyoxyethylene triols. The molecular weight of these polymeric triols so prepared may be varied greatly depending on the number of moles of ethylene oxide used in the reaction with the starter component. Starter components such as pentaerythritol and sucrose likewise treated with ethylene oxide lead to polymeric polyoxyethylene tetrols and hexols, respectively. Alternatively, polyols suitable for capping with polyisocyanate may be prepared from diols, triols, tetrols, hexols and polycarboxylic acids such as by the following mode:

Reaction I

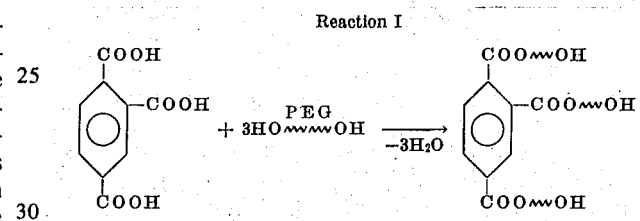

A useful polyisocyanate may be prepared from the reaction of a polyol with excess diisocyanate such as by the following mode:

Reaction II

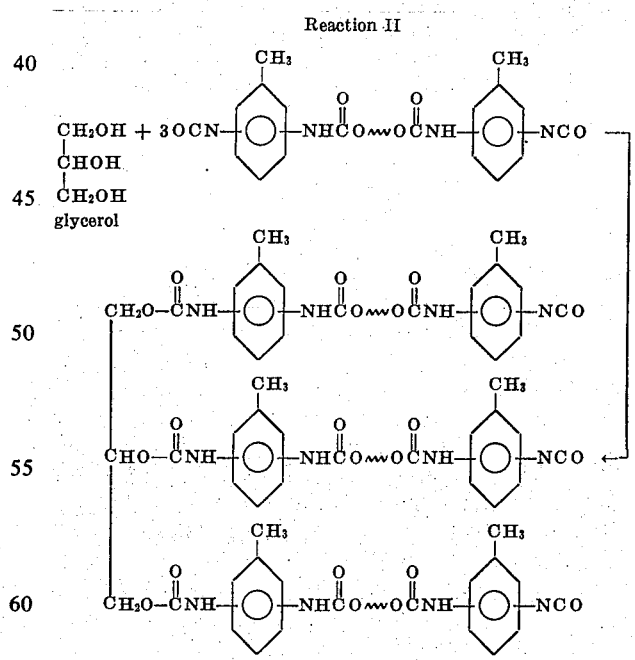

Any polyoxyethylene diols, triols, totrols or hexols may be capped with isocyanate end groups by reaction with an appropriate amount of a polyisocyanate. The end capping reaction may be exemplified by the following illustrative equation:

Reaction III

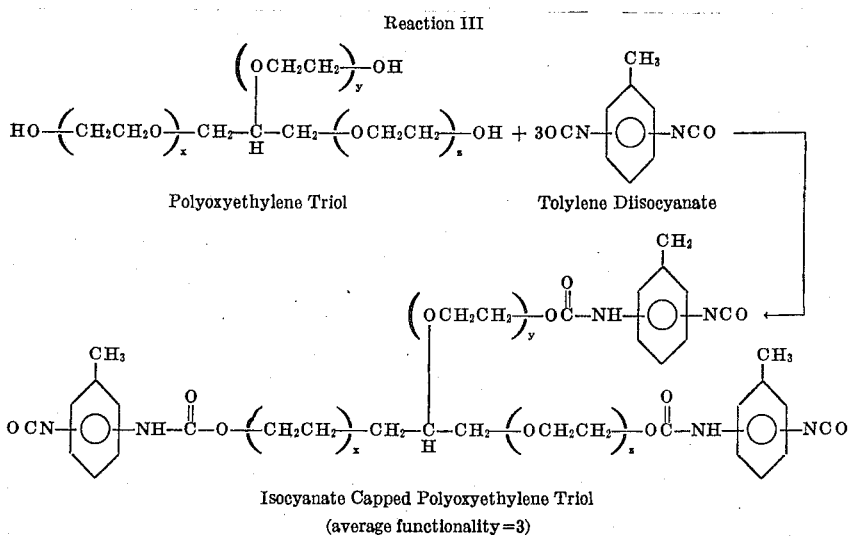

Isocyanate Capped Polyoxyethylene Triol
(average functionality=3)

Obviously the exact structure of the isocyanate capped polyoxyethylene polyols may be very complex and the simplified version shown in the above reactions is for purposes of illustration only. Further, blends or mixtures of the various polyols and/or polyisocyanates may be used as desired so long as the total average isocyanate functionality of the final urethane containing reaction product is greater than two.

Another possible mode used to prepare the capped polyoxyethylene polyol reaction product having an average isocyanate functionality greater than two is by reacting polyoxyethylene glycol having a reactive functionality equal to 2, with a molar excess of a diisocyanate which leads to an isocyanate capped polyurethane product (A) having an isocyanate functionality of two. A polyol such as pentaerythritol having a reactive functionality equal to 4 is reacted with a large molar excess of a diisocyanate to form an isocyanate capped polyurethane intermediate product (B) having an isocyanate functionality of four. By blending the two isocyanate capped products thus prepared, i.e., products (A) and (B), in various molar proportions, the resulting product mixture has an average isocyanate functionality greater than two and on treatment with aqueous reactants will lead to new improved hydrophilic crosslinked polyurethane foams illustrative of the present invention. In addition, other monomeric or polymeric polyisocyanate crosslinking agents may be substituted for the tetraisocyanate product (B). Tolylene-2,4,6-triisocyanate having a reative functionality of 3 is an example of a simple monomeric triisocyanate which may be usefully employed to achieve the same objective of imparting to the system an average isocyanate functionality greater than two. An example of a polymeric triisocyanate which may be similarly used is that shown in the descriptive Reaction III.

Still another useful mode within the scope of this invention for preparing crosslinked hydrophilic polyurethane foams is by using an isocyanate capped polyoxyethylene polyol reaction product having an average functionality of about two or greater which may be prepared as described previously. The technique following is crucial for those formulations where the average isocyanate functionality is only about two, because in these instances treatment with a large amount of water in foaming yields only a substantially linear, soluble thermoplastic foam having very little, if any, practical or commercial utility hereon. Thus, when it is desired to carry out the foaming reaction using this latter technique, the water of aqueous reactant used is pre-treated to contain a polyfunctional crosslinking agent which is reactive with isocyanate end groups of the capped reaction product. Such crosslinking agents may be solubilized or dispersed in the water or aqueous reactant, and must be sufficiently compatible with the capped reaction product to be able to react with the isocyanate groups and thus cause a crosslinked, insoluble, thermosetting network to form while the foaming process takes place. In this technique, then, a crosslinking agent reactive with isocyanate groups is contained in the water or aqueous reactant. After mixing with the isocyanate capped polyoxyethylene polyol reaction products, a crosslinking reaction results which takes place during and after the foaming step begins to take place. The presence of the crosslinking agent in the water or aqueous reactant is crucial when the isocyanate capped reaction product has a functionality of only about two and only optional when the functionality thereof is greater than two.

Water soluble or water dispersible crosslinking agents operable in this invention desirably should be polyfunctional and reactive with isocyanate groups and include but are not limited to materials such as diethylenetriamine, triethylene-tetramine, tetraethylenepentamine, polyethyleneimine, glycerol, trimethylolpropar-pentaerythritol, tolylene-2,4,6-triamine, ethylene diamine, amino-ethanol, trimethylenediamine, tetramethylenediamine, pentamethylene-diamine, hexamethylenediamine, ethanolamine, diethanolamine, hydrazine-triethanolamine, benzene-1,2,4-tricarboxylic acid, nitrilotriacetic acid, citric acid, 4,4'-methylenebis (o-chloroaniline), and the like. The water soluble or water dispersible crosslinking agents chosen are those which cause a crosslinked network to form during or after the foaming process begins to take place.

It has also been found that the capped polyoxyethylene polyol having an isocyanate functionality greater than two used to prepare a three dimensional network polymer must be present in an amount sufficient to insure formation of the dimensional network. Thus, amounts of the capped polyoxyethylene polyol having an isocyanate functionality greater than two in the component to be foamed range from about 3% by weight of this component up to 100% by weight. Thus, it is possible to include a capped polyoxyethylene polyol having a terminal member with an isocyanate functionality of two, i.e., a diisocyanate in an amount from 0% by weight up to about 97% by weight of the component to be foamed. The maximum amounts of diisocyanate used are limited to that necessary to permit crosslinking to take place during foaming, as contrasted to formation of a linear polymeric structure, and the properties desired in the finally prepared foam.

The polyoxyethylene polyols used in this invention are water soluble reaction products derived from the polymerization of ethylene oxide in the presence of a polyfunctional starter compound such as water, ethylene glycol, glycerol, pentaerythritol, sucrose and the like. The molecular weights may be varied over a wide range by adjusting the relative ratios of ethylene oxide monomer to starter compound. The preferred molecular weight ranges have been described previously.

It is possible and sometimes desirable to incorporate small amounts of a relatively hydrophobic comonomer into the ethylene oxide based polymerization products. Thus, comonomers such as propylene oxide or butylene oxide may be copolymerized as a random copolymer, block-copolymer, or both, such that the copolymers remain hydrophilic. Up to about 40 mole percent, but desirably about 25 mole percent or less, of the relatively hydrophobic comonomer may be copolymerized with the ethylene oxide monomer and still yield hydrophilic crosslinked network foams when those products are used as polyol intermediates in practicing the present invention. Thus, throughout this text, the term "polyoxyethylene polyol" is intended to include not only homopolymers of ethylene oxide but also hydrophilic copolymers of ethylene oxide such as those described above wherein all of these polyol derivatives have a hydroxyl functionality of about two or greater and an ethylene oxide content ranging from about 60 mole percent to about 100 mole percent, and preferably greater than about 75 mole percent.

To effect foaming and preparation of the crosslinked network polymer, the component including the isocyanate capped polyoxyethylene polyol having a functionality about 2 or greater is simply combined with a particular aqueous component while in the presence of seeds. For simplicity, this isocyanate capped reaction component will herein be referred to as resin reactant.

The aqueous component may appear as water, a water slurry or suspension, a water emulsion, or a water solution having water soluble materials disposed therein. For convenience, the aqueous component is referred to herein as an aqueous reactant.

In contrast to typical polyurethane reactions such as those using catalyst or like promotors where one mole of -NCO is reacted with one half mole water, the present reaction proceeds simply with a large but controlled excess of water, and thus permits foaming while in the presence of seeds and, if desired, up to large amounts of nutrients or soil conditioners.

Using the present resin reactant and water in amounts from about 0.5 mole $H_2O$/mole NCO groups up to about 2 moles $H_2O$/mole NCO groups results in poor foaming unless materials such as surfactants or the like are included. Amounts up to about 2 moles $H_2O$/mole NCO require a catalyst. When using about 6.5 moles $H_2O$/mole NCO groups up to about 390 moles $H_2O$/mole NCO groups, surprisingly good foams result which include bound seeds disposed such that germination and plant growth are possible. Thus, the available water content in the aqueous reactant is from about 6.5 to about 390 moles $H_2O$/moles NCO groups in the resin reactant, and desirably from about 20 to about 200 on the same basis.

"Available water" in the aqueous reactant is that water accessible for reaction with the resin reactant, and which is exclusive of water which may layer during reaction, or supplemental water which may be necessary because of further water-absorptive or water-binding components or additives present in and forming the aqueous reactant.

Thus, because large amounts of water may be in the aqueous reactant during reaction, i.e., the present invention is not dependent upon a molar NCO-water type reaction, it is possible to combine a great amount of additives including seed within the reaction system prior to foaming which would be otherwise not possible with limited water reacting systems.

The aqueous reactant may be used at temperatures from about 10° C. to about 100° C. as desired. It is possible to effect reaction of the resin reactant using steam as the aqueous component, absent seed at these extreme temperatures.

Large amounts of nutrients and similar additives may be added to the aqueous reactant. These additives may be added to the aqueous reactant. These additives may be added to the aqueous reactant in an amount up to 100 parts by weight of additive per part by weight of resin reactant of course, on the particular material and its weight.

Seeds usefully employed herein may be of most any type, including bulbs or the like of plants, grass, trees as desired without limitation.

The addition to the foaming reaction of an enriching agent or fertilizer or other medium capable of providing the necessary nutrients to the seed during the period of growth is desirable. Suitable fertilizers would include nitrogen, potassium, potash and magnesium.

In addition, insecticides, fungicides, nemacides, enzymes, hormones or the like in any desired bombination which will assist in the germination of the seed and growth of the plant may be included in the foaming reaction by means of the aqueous reactant or the resin reactant.

By providing all essential ingredients in a single unit, not only is planting technique simplified, but growth is stimulated.

The amount of the various components, including seeds, will depend on the type of seed and soil or other germinating conditions. Sufficient vermiculite or the like may be employed to retain moisture. Sufficient fertilizer or the like is employed to provide the proper growth and rate of growth for the seed used. The fertilizer may be a slow-release fertilizer which releases its nutrients at about the rate necessary for good growth instead of dissolving all at once.

The seed and other components may be introduced in any suitable manner. For example, the seed, etc., may be placed in the resin reactant, or aqueous reactant, or separately applied at predetermined location.

The seeds become encapsulated in foam and may be stored for long periods of time without danger of germination. However, care must be taken not to expose the packet to the direct action of water. When the growing season arrives, the seeds are then placed in an environment conductive to germination, which is generally soil, and exposed to water.

The fabric used as the support is desirably inexpensive and biodegradable. The fabric, either woven or non-woven, may be paper, plastic, cloth or the like as desired. Cheese cloth or tobacco cloth is found to be preferred since it is biodegradable and inexpensive to prepare.

The following examples will aid in explaining, but should not be deemed as limiting, practice of the present invention. In all cases, unless otherwise, noted, all parts and percentages are by weight.

EXAMPLE 1

A resin reactant was prepared by the following procedure:

To a reaction vessel containing 3,092 grams, representing 1 mole, 3 eq. OH, of a triol prepared from potassium hydroxide catalyzed reaction of 92 grams anhydrous glycerol with 3,300 grams of ethylene oxide, were added 522 grams, representing 3 moles, 6 eq. NCO of tolylene diisocyanate having about 80/20 mixture of 2,4 isomer/2,6 isomer. The reaction exotherm was kept at 70° C. by external cooling with water, while stirring for 4 hours. The actual isocyanate content, determined by titration with standard n-butylamine solution in toluene, remained at the constant level of 0.79 meq. NCO/gram relative to a theoretical content of 0.83 meq. NCO/gram. The resultant pale yellow syrup was found to solidify at about 30°–35° C., was soluble in toluene, and acetone, readily reacts with water, and had the following idealized formula:

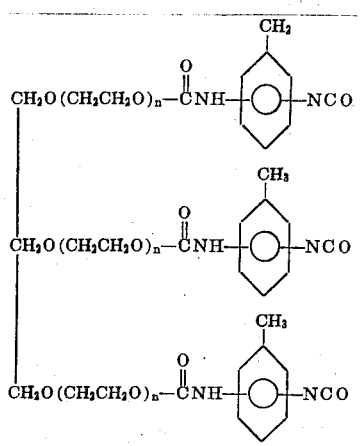

where $n$ has an average value of about 22. The theoretical molecular weight of the resin product is about 3,615.

Twenty greater gram portions of the recovered resin having an eq. NCO content of 0.016 was reacted with 30 grams of water (1.7 moles) while disposed at 1 inch relative positions on cheese cloth. Thereafter, annual Italian rye grass seed was sprinkled over the reacting foam. The generated foam was found to contain seeds encapsulated therein. The seed-foam-fabric composite was formed into a handy blanket which when spread out on the ground and watered in the usual manner found that the seed germinated and gave uniform carpet of grass sod.

The resultant foam had a thickness of about ¼ inch. One half of the pad sample was allowed to stand at 25° C., 30 percent relative humidity in the dark for 1 month with no apparent germination of the grass seed. The remaining half of the seed-foam-fabric composite was kept moist with 50 ml. water applied every 48 hours. After 6 days of exposure to daylight the grass seed germinated a uniform green carpet of grass formed after 11 days.

The first half section of the foam-seed-fabric composite which had been kept in the dry, dark ungerminated state for 1 month was then kept moist and in the light as described above. Again, the seed germinated within 7 days and a uniformly green blanket of grass sod formed in 12 days.

EXAMPLE 2

The procedure of Example 1 was repeated except using a foam prepared as followed.

A solution of 92 grams glycerol representing 1 mole, 3 eq. OH, and 1,000 grams of polyoxyethylene glycol 1,000 representing 1 mole, 2 eq. OH was outgassed at 100° C. and 10 Torr for 2 hours. To the outgassed solution was added 870 grams representing 5 moles tolylene diisocyanate having an 80/20 mixture of 2,4 isomer/2,6 isomer. The reaction solution was stirred at 60° C. for 4 hours whereupon the actual isocyanate content reacted a constant 2.49 meq. NCO/gram relative to a theoretical content of 2.54. The resin product had a pale orange color, a density of 1.10, and a viscosity (Brookfield No. 4 spindle) at 25° C. of 13,400 cps. 31.3 parts of the resin product representing 50 mole percent had a theoretical molecular weight of 615, and the following formula (idealized):

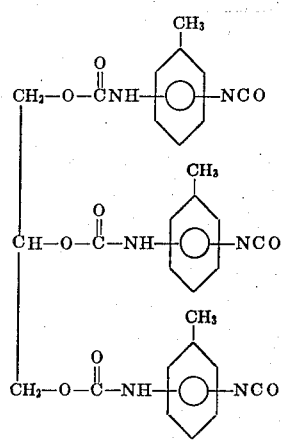

while 68.7 parts of the resin product representing 50 mole percent was found to be

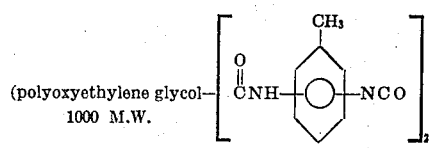

having a theoretical molecular weight of 1348. The actual NCO content of this resin product was 2.49 meq. NCO/gram relative to a theoretical content of 2.54 meq. NCO/gram.

6.5 quarter gram portions of the recovered resin having an eq. NCO content of 0.016, was combined with green colorant and was reacted with 50 relative grams of water (2.8 moles) containing 5 grams of Kentucky Bluegrass while disposed on burlap fabric sheet.

Corresponding results were realized.

EXAMPLE 3

The procedure of Example 1 was repeated except using a resin prepared by capping of a polyoxyethylene diol with a polyisocyanate having a functionality greater than 2, to give polyisocyanate foams with higher crosslink density and superior physical properties, lower solubility, and greater hydrolytic stability than foams from polyoxyethylene diisocyanates. A 1,000 gram portion, 0.25 eq. OH, of polyoxyethylene glycol of 4,000 weight average molecular weight was outgassed at 110° C. and 10 Torr for 2 hours. Next, to this outgassed liquid was added at 60° C. 200 grams, 0.5 moles, 1.5 eq. NCO, of polymethylene polyphenylisocyanate commercially available under the name PAPI 901 by Upjohn Co. This latter material has nearly three isocyanate groups per molecule and an isocyanate equivalent weight of 133. A dark reaction solution was noted which was stirred at 60° C. to 70° C. for 5 hours whereupon the NCO content reached a constant 0.825 meq. NCO/gram relative to a theoretical value of 0.833. The resultant dark product solidified at 45° C. to form a brown, waxy product.

Again, corresponding results were realized.

EXAMPLE 4

The procedure of Example 1 was repeated except using a resin prepared from copolymers of 75% ethylene oxide and and 25% propylene oxide along with methylene dicyclohexyl diisocyanate which form a triisocyanate that readily reacts with water to give hydrophilic foams. A mixture of 13.4 grams, 0.1 mole of trimethylolpropane and 0.6 grams, 0.01 mole of potassium hydroxide was stirred at 100–180° C. in the presence of 250 grams of ethylene oxide at 20 to 100 psi. After 3 hours the reaction pressure dropped to 1 atmosphere. To the reaction product syrup was then added 250 grams of propylene oxide with stirring at 100°–180° C., and a pressure of 20 to 75 psi for 4 hours whereupon the reaction pressure at 100° c. dropped to 1 atmosphere. To this reaction product syrup having a brown color was added 500 grams of ethylene oxide. The reaction was stirred at 100°–180° C. for 12 hours whereupon the reaction pressure dropped to 1 atmosphere at 100° C. The resultant brown oil was stripped of volatiles at 50° to 100° C. at 10 Torr resulting with 978 grams of brown syrup having a hydroxyl content of 0.32 meq. OH/gram relative to 0.31 meq./gram theory.

To 931 grams, 0.30 OH, of the prepared triol was added 88.0 grams, 0.32 moles, of dicyclohexylmethane diisocyanate. The solution stirred at 60° C. for 8 hours whereupon the NCO content of the polymer reached a constant 0.33 meq./gram relative to 0.32 theory. The triisocyanate product was characterized as a light amber syrup having a viscosity of 12,000 cps at 25° C. (Brookfield), and was processed and described in Example 1 for preparation of a seed-foam-fabric composite.

Corresponding results of growth were realized.

EXAMPLE 5

The procedure of Example 1 was repeated except using a foam prepared by crosslinking and three dimensional foam formation, using a polyoxyethylene glycol capped with diisocyanate, a polyamine during foaming, i.e., diethylene triamine (DETA), water and nutrients. The diisocyanate capped polyoxyethylene glycol resin product (DPG) had the following average formula:

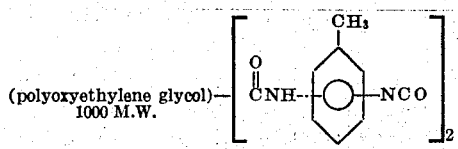

a molecular weight, theory, of 1,348, and an actual NCO content of 1.42 meq. NCO groups/gram relative to 1.49 meq. NCO groups/gram theory.

EXAMPLE 6

The procedure of Example 5 was repeated except using a polyol (glycerol) during foaming, in place of DETA. Corresponding results were realized to that of Example 1.

EXAMPLE 7

The procedure of Example 5 was repeated except using a polythiol during foaming, i.e., tetrakis ($\beta$-mercapto-propionate) commercially available from Carlisle Chemical Co. under the tradename "Q43," in place of DETA. Corresponding results were realized.

The simplicity and foolproof nature of preparing the foams without excessive expenditures for equipment characterizes the present foams especially economically attractive.

It is understood that the foregoing detailed description is given merely by way of illustration and that many variations may be made therein without departing from the spirit of this invention.

We claim:

1. A method for preparing improved crosslinked hydrophilic foam seed-fabric composite, said method comprising depositing a multiple number of islands of a first component comprising isocyanate capped polyoxyethylene polyol having a reaction functionality greater than two, onto a fabric support layer, and reacting the deposited islands with a second component comprising aqueous reactant and seeds, the ratio of moles $H_2O$/moles NCO groups being about 6.5 to about 390 in said second and first components respectively, whereby the reaction product comprises islands of foam on said support layer, said islands containing seeds.

2. The method of claim 1 wherein the capped polyoxyethylene polyol is present in the first component in an amount from about 3% by weight up to 100% by weight, and wherein a capped polyoxyethylene polyol having a terminal member with an isocyanate functionality of two is present in an amount from 0% up to about 97% by weight.

3. The method of claim 1 wherein the polyoxyethylene polyol moiety of the isocyanate capped member has a weight average molecular weight of about 200 to about 20,000, and a hydroxyl functionality of about 2 to about 8.

4. The method of claim 3 wherein the weight average molecular weight is about 600 to about 6,000.

5. The method of claim 1 wherein the ratio of moles $H_2O$/moles NCO groups is from about 20 to about 200.

6. The method of claim 1 wherein the fabric is biodegradable.

7. The method of claim 1 wherein the fabric is selected from the group consisting of paper, plastic and cloth.

8. A method for preparing improved crosslinked hydrophilic foam seed-fabric composite, said method comprising depositing a multiple number of islands of a first component comprising isocyanate capped polyoxyethylene polyol having a reaction functionality equal to about two onto a fabric substrate, and reacting the islands with a second component comprising aqueous reactant, seeds, and a crosslinking agent having a reaction functionality greater than 2, the ratio of moles $H_2O$/moles NCO groups being about 6.5 to about 390 in said second and first components respectively.

9. The method of claim 8 wherein the crosslinking agent of the third component is a polyol.

10. The method of claim 8 wherein the crosslinking agent of the third component is a polythiol.

11. The method of claim 8 wherein the crosslinking agent of the third component is a polyisocyanate.

12. The method of claim 8 wherein the crosslinking agent of the third component is a polyamine.

13. The method of claim 8 wherein the polyoxyethylene polyol moiety of the isocyanate capped member has an average molecular weight of about 200 to about 20,000, and a hydroxyl functionality of about 2 to about 8.

14. The method of claim 8 wherein the weight average molecular weight is about 600 to 6,000.

15. The method of claim 8 wherein the ratio of moles $H_2O$/moles NCO groups is from about 20 to about 200.

16. The method of claim 8 wherein the fabric is biodegradable.

17. The method of claim 8, wherein the fabric is selected from the group consisting of paper, plastic and cloth.

18. A method for preparing a crosslinked hydrophilic foam-seed-fabric composite, comprising depositing multiple, spaced islands of isocyanate capped polyoxyethylene polyol having a reaction functionality greater than two onto a fabric support layer, adding an aqueous reactant to said islands, the ratio of moles $H_2O$/moles NCO groups being about 6.5 to about 390 in said polyol and reactant, respectively, whereupon said islands begin to foam, and prior to the completion of the foaming, adding seeds to said islands, whereby each foamed island contains a seed.

19. A method for preparing a crosslinked hydrophilic foam-seed-fabric composite, comprising depositing a multiple number of islands of a first component comprising isocyanate capped polyoxyethylene polyol having a reaction functionality equal to about two onto a fabric support layer, and reacting the islands with an aqueous component and a crosslinking agent having a reaction functionality greater than two, the ratio of moles $H_2O$/moles NCO groups being about 6.5 to about 390 in said polyol and aqueous component, respectively, whereupon said islands begin to foam, and prior to the completion of the foaming, adding seeds to said islands, whereby each foamed island contains a seed.

* * * * *